May 20, 1958 H. F. FEHLBERG 2,835,226
CONTROL UNIT

Filed March 24, 1952 2 Sheets-Sheet 1

INVENTOR.
Harold F. Fehlberg.
BY
Harness, Dickey & Pierce.
ATTORNEYS.

May 20, 1958  H. F. FEHLBERG  2,835,226
CONTROL UNIT
Filed March 24, 1952  2 Sheets-Sheet 2
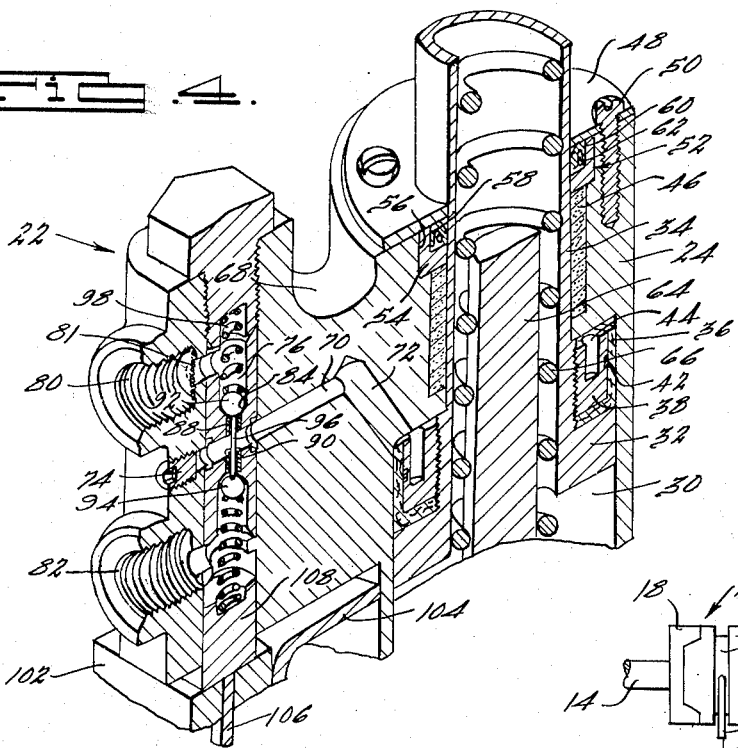
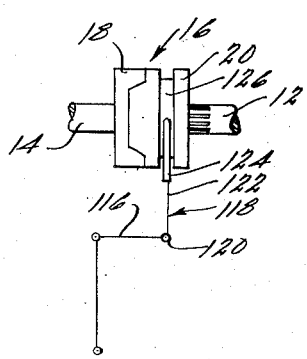
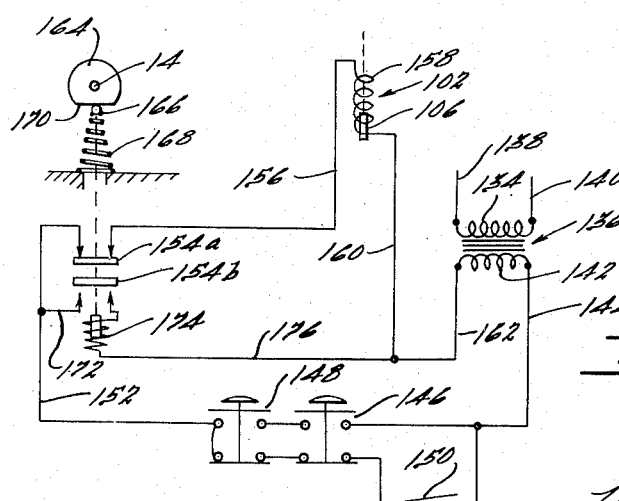
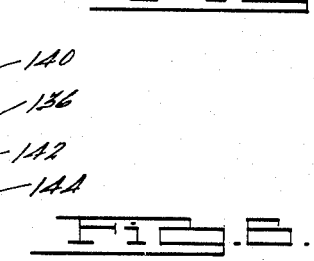
INVENTOR.
Harold F. Fehlberg.
BY
Harness, Dickey & Pierce.
ATTORNEYS.

2,835,226
Patented May 20, 1958

2,835,226

CONTROL UNIT

Harold F. Fehlberg, Detroit, Mich.

Application March 24, 1952, Serial No. 278,276

7 Claims. (Cl. 121—38)

This invention relates broadly to unit mechanisms for controlling the operation of machine tools and more particularly to a control unit of this type which is primarily adapted and pre-eminently suited for operating the cycle-start mechanism of punch presses and the like.

An important object of the invention is to provide a control unit of the above-mentioned character that is operative to start the machine on which it is mounted in operation and which functions to prevent automatic recycling of the machine after it completes its operating cycle.

Another object of the invention is to provide a control unit of the above-mentioned character having an electrically operated valve which is uniquely constructed to prevent residual magnetism in the armature of the operating solenoid from preventing proper operation of the valve.

Still another object of the invention is to provide a control unit of the above-mentioned character having a valve which is uniquely constructed to prevent binding and excessive wear of the moving parts.

Yet another object of the invention is to provide a control unit of the above-mentioned character having relatively few parts subject to excessive wear or requiring frequent replacement so as to minimize maintenance costs and operating expenses.

Other objects and advantages of the invention will be apparent during the course of the following description.

In the drawings forming a part of this specification and wherein like numerals are employed to designate like parts throughout the same:

Fig. 4 is a fragmentary view similar to Fig. 2 but showing a portion only of the control unit and particularly illustrating the valve positioned to shut off fluid pressure and venting the cylinder;

Fig. 5 is a diagrammatic view showing a suitable linkage for connecting the control unit to the cycle-start mechanism of the machine; and Fig. 6 is a diagrammatic view of an electric control circuit for the unit.

Figures 1, 2, 3:
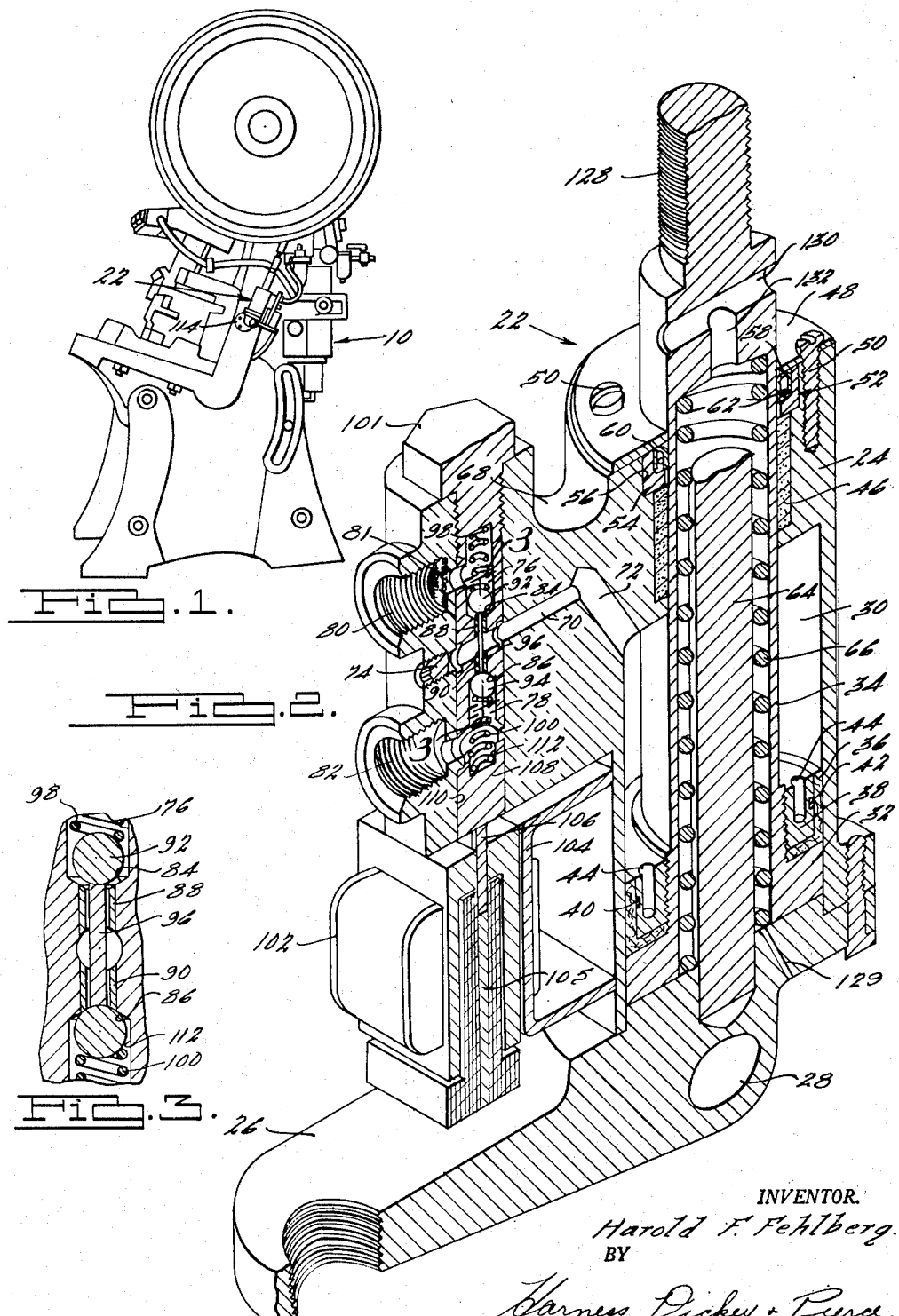
Fig. 1 is a side elevational view showing a control unit embodying the invention mounted on a punch press.
Fig. 2 is an enlarged, vertical, sectional view through the control unit particularly illustrating the pneumatically actuated piston which operates the cycle-start mechanism of the machine and showing the solenoid-operated valve positioned to direct pressure fluid from a suitable source into the cylinder in which the piston operates.
Fig. 3 is an enlarged, fragmentary, sectional view taken on the line 3—3 of Fig. 2.

As suggested, the control unit of this invention is adapted for use on many different machines and by way of illustration only is here shown mounted on and operatively associated with a punch press illustrated generally at 10. It will be readily appreciated in this connection that the control unit is not limited to this use and it is contemplated that it be used in any capacity where it has utility. The press 10 here shown is conventional, having a drive shaft 12 and a driven shaft 14 mutually interconnected by a conventional one-revolution clutch 16. The clutch 16 has the usual jaw 18 which is fixed on the driven shaft 14 and a companion jaw 20 which is rotatably fixed but relatively slidable on the drive shaft 12. When the jaw 20 is retracted it disengages the jaw 18 and disconnects the drive shaft 12 from the driven shaft 14. Alternatively, when the jaw 20 is advanced to engage the jaw 18 as shown in the drawings, the drive shaft 12 is connected to the driven shaft 14 so that the two rotate in unison. In operation the jaw 20 is disengaged automatically from the jaw 18 after each operating cycle of the press by conventional means (not shown) and each new cycle of operation is initiated by engaging the two jaws 18 and 20 of the clutch 16.

A control unit 22 is mounted at any suitable location on the press 10 for operative connection to the clutch 16. The unit is small and compact, being contained substantially entirely within a cast metal housing 24 having a laterally extending base 26 provided with a suitable hole 28 by means of which the unit is fastened to the frame of the machine.

One side of the housing 24 is fashioned to define a vertical cylinder 30, and a piston 32 is mounted for reciprocation in the cylinder. The particular piston 32 here shown has an upwardly extending rod portion 34, and a cup 36 of leather or the like is detachably fastened on the piston 32 by a threaded ring 38. The leather cup 36 has an inturned lower flange which is clamped tightly between the piston 32 and the threaded ring 38 and an upwardly extending annular skirt disposed between the ring and the wall of the cylinder 30. Fluid pressure in the cylinder 30 above the piston forces the annular skirt portion of the cup 36 outwardly against the wall of the cylinder to seal the latter and to prevent fluid pressure from blowing past the piston during operation of the device. A circular expander spring 40 preferably is provided behind the skirt portion of the cup 36, and the spring normally holds the skirt outwardly against the cylinder wall even though there is no pressure in the cylinder. Although not essenital, the expander spring 40 is highly desirable, as the cup 36 tends to shrink or pull away from the cylinder wall when the device is permitted to remain idle for any substantial period of time. When this occurs, fluid pressure in the cylinder, acting alone, may not be able to expand the cup against the cylinder wall to prevent pressure from blowing past the piston until after the device is operated for a few times, and the disadvantages of this condition are at once apparent. If there is insufficient room between the skirt portion of the cup 36 and the clamping ring 38, the latter conveniently may be provided with an annular external groove 42 which accomodates the spring, as shown in the drawings. The particular clamping ring 38 here shown is provided with a pair of holes 44 at opposite sides thereof which receive a spanner wrench or the like used for tightening and loosening the ring on occasions, as when the cup 36 must be replaced.

The piston rod 34 extends from the cylinder 30 through the upper end of the housing 24, and the upper terminal portion of the rod is supported by a suitable bearing 46.

An annular plate 48 is fastened on the upper end of the housing 24 around the piston rod 34 by screws 50 and the plate retains a seal 52 which prevents leakage of pressure from the cylinder 30 through the upper end of the housing.

The seal 52 is a feature of the invention, since it is particularly effective to prevent pressure in the cylinder 30 from escaping upwardly along the piston rod 34 without binding against the rod. O rings conventionally used for this purpose fit tightly around the rod and render the latter difficult to operate. Also, pressure between the O ring and the rod causes excessive wear of the contacting parts. Wear soon renders the seal ineffective and necessitates frequent replacement thereof in order to maintain the control unit properly operative. The particular seal 52 here shown has an annular mounting ring 54 which fits snugly in an annular recess 56 and loosely around the rod 34. An annular internal recess 58 provided in the ring 54 receives an inverted U-shaped annular sealing member 60 of inherently flexible resilient material such as plastic, rubber, leather or the like. A circular spring wire 62 surrounds the inner flange of the sealing member 60 and normally holds the latter lightly against the piston rod 34. Air admitted to the cylinder 30 under pressure has access to the seal 60 and this air holds the inner flange of the seal tightly against the piston rod 34. Thus, under these conditions the seal tightens up on the rod to prevent leakage from the cylinder. However, as soon as pressure in the cylinder is relieved, the seal 60 immediately loosens so that the piston can be readily reciprocated in the cylinder without binding effect from the seal and without causing excessive and unnecessary wear either of the seal or of the rod.

The particular manner in which the piston is guided and retracted in the cylinder also is a feature of this invention. In this connection it will be observed that the rod 34 is of hollow construction and that the hollow interior of the rod opens downwardly through the bottom of the piston 32. A guide pin 64 fixed in the bottom of the cylinder extends upwardly into the hollow interior of the piston rod 34, and a spring 66 is disposed in the piston rod around the pin. It will be observed in this connection that the pin 64 is disposed substantially in coaxial relation with the rod 34 and that the convolutions of spring 66 fit between the pin and the rod. Also, it will be observed that the spring 66 bears against the lower end of the cylinder and also against the upper end of the internal chamber of the rod 34. Preferably the spring 66 is maintained under tension or preloaded, even when the piston is fully retracted or raised in the cylinder 30. In this manner the convolutions of the spring 66 which surround pin 64 serve as a bearing for the piston and assist in guiding the latter during its reciprocatory travel in the cylinder 30. Further, by reason of the fact that the spring 66 does not fit tightly either against the rod 34 or the pin 64, there is no tendency for the spring to bind or catch in use and thus render it ineffective to perform its intended function of retracting or raising the piston each time pressure to the cylinder is shut off. Spring 66 holds the piston 32 normally raised in the cylinder 30, and air pressure admitted to the cylinder causes the piston to advance or move downwardly in the cylinder.

In addition to the advantages pointed out above, the particular construction now under consideration has the advantage of protecting the spring 66 at all times. Heretofore, it has been conventional practice on devices of this type to maintain the piston retracting spring outside the piston rod and exteriorly of the cylinder. This arrangement exposes the spring so that it is frequently struck blows of sufficient force to permanently damage it and to render it ineffective to retract the piston. As will be hereinafter more readily apparent, failure to retract the piston causes the press or other device controlled by the unit to repeat its cycle of operation; and when this occurs, work is almost invariably ruined, the press itself may be seriously damaged, and the operator may sustain substantial personal injuries. Damage to the spring which retracts the piston is a frequent source of trouble in machines of this type, and the particular arrangement here shown obviates this source of trouble.

According to the present invention, the side of the cast metal housing 24 opposite the cylinder 30 encloses a valve mechanism which controls flow of air or other actuating fluid under pressure to the cylinder 30, and the portions of the housing which receive the cylinder and the valve mechanism are interconnected by an integral web 68. By forming the housing 24 in this manner, an integral, unitary, one-piece construction is provided which eliminates hose connections, fittings, couplings, and the like conventionally provided between the operating cylinders and their control valve, and elimination of these connections also eliminates attendant leakage, failures and other structural weaknesses. By mounting all of the operating mechanisms in a one-piece housing, a stronger, superior and longer lasting control unit is achieved.

More particularly, air is conducted to the cylinder 30 through a passage 70 opening at its inner end into a passage 72 which extends angularly downwardly to the top of cylinder 30. The outer end of passage 70 is closed by a plug 74. Adjacent the outer end of passage 70 are bifurcations 76 and 78. Bifurcation 76 extends upwardly from the passage 70 and communicates with an air inlet 80. A screen 81 in the bottom of the inlet 80 prevents dirt and other foreign matter which might lodge between the ball valve and its seat or otherwise render the device inoperative or faulty in operation from entering the valve casing with the incoming air. Bifurcation 78 extends downwardly from passage 70 and communicates with an air outlet 82. As clearly shown in the drawings, the bifurcations 76 and 78 are disposed in precise vertical alignment and at opposite sides of the passage 70. In practice, air under pressure is admitted to the inlet 80, and it will be readily appreciated that any suitable coupling or connection (not shown) may be attached to the inlet in order to conduct the air to the housing 24. Similarly, air vented from the outlet 82 may be disposed of in any suitable manner and, if desired, suitable conventional hoses and couplings (not shown) may be connected to the outlet 82 for this purpose.

In order to control the flow of air through passage 70, the bifurcations 76 and 78 are formed with outwardly directed valve seats 84 and 86 respectively. These seats 84 and 86 are spaced from the passage 70 and bearings 88 and 90 preferably of stainless steel are provided between the valve seats and the passage. Ball valves 92 and 94 provided in the bifurcations 76 and 78 are adapted to engage respective valve seats 84 and 86, and a rod 96 journaled for sliding reciprocatory movement in bearings 88 and 90 engages endwise against the ball valves 92 and 94. It is a feature of this invention that the rod 96 is slightly longer than the distance between the valve seats 84 and 86 so that one of the valves is always open when the other valve is closed. Thus, as ball valve 92 engages its seat 84 to close the air inlet 80, the other ball valve 94 is off its seat 86 to open the air outlet 82. Alternatively, if the ball valve 94 is in engagement with its seat 86 the other ball valve 92 is off its seat 84 to open the air inlet 80. In actual practice the rod 96 need open the valves 92 and 94 only a few thousands of an inch.

It is of course exceedingly important in order to assure proper efficient operation of the valve mechanism that the rod 96 operate smoothly at all times. In view of the small movement of the valves 92 and 94, the rod 96 must engage the ball squarely and identically at all times in order to assure proper, uniform operation of the valves; however, the rod cannot be supported too closely by the bearings 88 and 90, as it must be spaced sufficiently from the walls of the bearings to permit air to pass freely from the inlet 80 into the passage 70 and from the passage 70 to the outlet 82. In order to meet this condition, the ends of the rod 96 are cupped; that is, the ends of the rod are formed with spherical, concave depressions (Fig. 3) which receive and conform to the ball valves 92 and 94. When the cupped ends of the rod 96 are employed in combination with the ball-shaped valves, the parts mutually cooperate to hold the rod aligned exactly in its bearings and to prevent the rod from cocking and binding in the bearings. Thus, smooth, easy operation of the valve mechanism is assured and excessive wear of the relatively thin and fragile rod due to rubbing thereof against the sides of the bearings is prevented. Proper and continuous engagement of the ball valves 92 and 94 with the rod 96 is assured at all times by springs 98 and 100 confined between the valves and the adjacent ends of the bifurcations 76 and 78. The upper spring 98 preferably is relatively light and exerts only slight force against the ball valve 92 as its primary purpose is merely to hold the valve at all times against and properly centered with respect to the pin 96 and to obtain faster and more positive closing action of the valve. For reasons hereinafter more clearly apparent the lower spring 100 preferably is relatively stronger, since it must close the lower valve 94 against the combined action of the upper spring 98 and air pressure in the bifurcation chamber 76 above the valve 84. The valve assembly is here shown confined by the shank of a screw 101 in a bore 110 and screw-threadedly attached to the housing 22, as shown in Figs. 2 and 4. This construction is convenient because under certain circumstances it is desirable to insert the screw 101 upwardly into the bore 110 and to mount the solenoid 102 at the top of the housing instead of in reverse of it as shown in the drawings. This can be easily accomplished according to the exigencies of the particular situation as the valve parts are assembled as a complete subassembly within the bore 110 as shown. The balls 92 and 94 tend to rotate a little bit each time the valve mechanism operates, and this rotary motion of the balls keeps them polished for proper engagement with the valve seats. Also, this rotary movement of the balls prevents formation of a ring or groove after a period of time due to constant repeated engagement of the balls with the seat. Formation of such a groove in the valve member renders them faulty in operation and tends to permit air to leak between the valve and its seat. This feature makes the new arrangement superior to conventional plunger-type valves which do tend to wear in operation and become faulty in the respects set forth above.

In order to operate the valve mechanism, a solenoid 102 is mounted on the housing 24 by means of a suitable bracket 104 with the armature 105 thereof below and in direct alignment with the valves. Also, the solenoid 102 is positioned so that the armature 105 moves back and forth in the same direction and in coaxial relation with the rod 96. A suitable hardened metal pin 106 is set into a centrally located hole in the top of armature 105 and is suitably fastened therein as by silver soldering or the like. This pin engages upwardly against a plug 108 which is slidably journaled in an aligning bore 110 provided in the housing 24 and the inner end of the plug is formed with a socket 112 which receives and seats the lower end of the spring 100. Engagement of the pin 106 with the plug 108 prevents teetering of the armature laminations on the upstroke of the armature and consequential spreading or mushrooming of the laminae which ultimately would tend to bind the armature and prevent it from operating properly. It will also be apparent in this connection that the pin 106 acts as a top bearing surface which supports the top of the armature.

When the solenoid 102 is energized, the armature 106 moves upwardly, compressing the relatively heavy spring 100 and forcing the valve 94 against its seat 86. As this action occurs, movement is transmitted through rod 96 to lift ball valve 92 from its seat against the action of spring 98 and open the inlet 80. Conversely, when the solenoid 102 is de-energized, the armature 105 drops down, relieving spring 100. As the armature 105 moves downwardly, the spring 100 gradually relaxes and finally becomes fully extended. Thereafter, continued downward movement of the armature 105 permits the lower valve 94 to move away from its seat and open the passage 70 to the outlet 72. At the same time, the pin 96 drops away from the upper valve 92 so that the combined action of the spring 98 and air pressure entering the bifurcation chamber 76 through the inlet 80 holds the valve securely seated to shut off air pressure to the passage 72, permitting ball valve 94 to open and ball valve 92 to close, thus connecting the cylinder 30 with the air outlet 82. In the instant arrangement, spring 100 serves the additional function of overcoming residual magnetism which sometimes causes the armature 105 to stick or be retained in the raised position. This tendency is satisfactorily overcome or compensated by the novel spring and valve arrangement shown. Also, the spring 100 functions as a buffer between the valve 94 and the plug 108 and provides a convenient means for taking up overtravel of the armature 105. This is a convenience afforded by the instant arrangement, and it eliminates the necessity of mounting the solenoid with extreme accuracy with respect to the valve mechanism in order to assure proper operation of the valve.

The housing 24 conveniently may be mounted on the machine 10 to be controlled by the unit in any suitable manner. Manifestly, the particular manner of mounting the unit will vary, depending upon the construction and operation of the particular machine. Usually it is convenient to mount the housing 24 on the frame of the machine at some convenient point by means of the bottom bracket 26. In Fig. 1 I have shown the housing fastened to the frame of machine 22 by means of a separate mounting bracket 114, and the piston rod 34 is connected to one arm 116 of a bell crank 118 which is pivoted to the machine at 120 in any suitable manner. The other arm 122 of the bell crank 118 carries a yoke 124 which fits into a peripheral groove 126 in the movable clutch jaw 20 according to conventional practice. It will be observed in this connection that the mounting hole 28 is located directly below and in axial alignment with the piston rod 34. This arrangement permits the valve to pivot as a unit about a mounting bolt inserted through the hole 28 and prevents breakage of the clutch tripping rod or other parts of the device or machine. In order to facilitate connection of the control unit to the operating linkage described above, the piston rod 34 preferably is provided with a terminal 128 upon which a suitable nut (not shown) or the like can be threaded in making the connections. Also, it will be observed that the piston rod 34 is provided exteriorly of the housing 24 with a transverse passage 130 and that a short, longitudinal passage 132 is provided interconnecting the passage 30 and the hollow interior of the rod. The two passages 130 and 132 provide a vent for air trapped in the piston rod. When the piston 32 moves downwardly in cylinder 30, air trapped in the cylinder ahead of the piston can escape through the hollow interior of the piston rod and outwardly through passages 130 and 132. Also, a small vent 129 is provided at the bottom of the cylinder to facilitate escape of air when the piston moves downwardly or advances. The passage 130 also provides a convenient means in which a suitable tool can be inserted for holding the piston while a nut is being tightened on the terminal 128 or removed therefrom. A suitable coupling or union conventionally is applied to the threaded upper end 128 of the piston rod to fasten the same to the clutch-operating means 118, and the passage 130 also provides a convenient means for holding the rod against rotation while the coupling is applied thereto. Also, it will be apparent that the coupling can be adjusted on the threads 128 to adjust the stroke of piston 32 and the passage 130 offers a convenient holding means during such adjustment. If some means, such as the passage 130, were not provided, it would be necessary to clamp the projecting upper end of the piston rod by pipe linkage or the like when tightening the coupling on the threaded end 128 and this expedient might very well mar or deface the rod to such an extent that it would not operate properly. These difficulties are obviated by providing the cross hole or passage 130.

Attention is now directed to Fig. 5 of the drawings which shows a novel electrical control circuit for the unit. Current is supplied to the primary coil 134 of a transformer 136 from any suitable source through lines 138 and 140. The secondary coil 142 of the transformer 136 is connected by conductor 144 to a pair of hand-operated push-button switches 146 and 148 which, in turn, are connected in series with each other and in parallel with a foot-operated switch 150. From the switches current passes through a conductor 152 to a switch 154a and thence through conductor 156 to the winding 158 of the valve-operated solenoid 102. From the solenoid 102 current travels back to transformer 136 through conductors 160 and 162. Switches 146, 148, and 150 are normally open and the valve-operating solenoid 102 is energized whenever both of the hand-operated switches 146 and 148 or the foot-operated switch 150 is closed. Switch 154a is normally closed as shown in the drawings so as not to prevent energization of the solenoid 102.

According to the present invention the switch 154a is operated mechanically by a cam 164 which preferably and conveniently is fastened on the driven shaft 14 and a cam follower 166 which interconnects the cam and the switch. The follower 166 is held in contact with the cam 164 by a spring 168. In this connection, it will be observed that the cam 164 is formed with a flat side 170, and the cam is positioned on the shaft 14 so that the flat registers with the follower 166 when the machine 10 has completed an operating cycle. When the cam is positioned in this manner the spring 168 raises follower 166 and closes switch 154a. On the other hand, when the cam 164 is positioned to bring its peripheral surface into register with the follower 166, the latter is depressed against the action of spring 168, and switch 154a is opened so as to interrupt the circuit hereinabove described through the valve-operating solenoid 102. It is a feature of this invention that the switch 154a has a tandem switch 154b coupled thereto for operation in unison therewith. The latter switch is normally open as shown in Fig. 6 and is connected to the line 152 by a conductor 172. The other side of the switch 154b is connected to a solenoid 174 and the latter is connected to line 162 by a conductor 176. The armature of solenoid 174 is mechanically connected to the two switches 154a and 154b. Solenoid 174 is energized when switch 154b closes; and when energized, the solenoid is operative to hold switch 154b closed against the action of spring 168. Thus, if the solenoid 174 remains energized, the follower 166 will not rise to close switch 154a when the flat 170 is again presented to it at the end of the machine-operating cycle. This is an important safety factor since it holds switch 154a open and prevents the machine from repeating or recycling in the event the operator holds switches 146 and 148 or switch 150 closed inadvertently or otherwise during the entire operating cycle of the machine.

In operation, the operator first closes switches 146 and 148 or the foot switch 150 to initiate the operating cycle of the machine. Two hand switches 146 and 148 conventionally are provided in series so that the operator must press upon switches with both hands before he can start the machine in operation. This is a conventional safety feature, since it requires that the operator have both of his hands out of danger before he can start the machine in operation. As soon as the starting switch or switches are closed, a circuit is completed through the valve-operating solenoid 102; and as soon as this solenoid is energized, it closes the ball valve 94 and opens ball valve 92 to admit air under pressure into cylinder 30. Pressure in the cylinder 30 forces piston 32 downwardly and as the latter advances it acts through the bell crank 118 to engage the clutch 16. In practice, air is admitted at a controlled pressure into the inlet 80 and the air pressure is so correlated with respect to the spring 66 that the full pressure is required to advance piston 32. As a consequence the valves 92 and 94 must be functioning properly or the machine will not operate. Any leakage past valve 94, for example, so lowers pressure in the cylinder 30 that the piston 32 cannot be forced downwardly to engage the starting clutch 16. Manifestly, the described relationship between the operating air and the spring 66 is a safety feature as the device will not operate if the valve mechanism becomes faulty so as to permit leakage of air past the ball valve 92. It is thus incumbent on the user to maintain the device in proper operating condition at all times. Engagement of the clutch 16 of course starts the machine in operation and causes cam 164 to rotate until the follower 166 rides up on the peripheral surface of the cam. It is necessary for the operator to hold the cycle-start switches closed long enough for the cam to reach this position. Rotation of the cam to this extent depresses the follower sufficiently to open switch 154a and close switch 154b. As soon as switch 154a opens, solenoid 102 is de-energized, but this is without effect in so far as the operation of the machine is concerned, as the clutch 16 is already engaged and it will remain engaged for one complete revolution of the drive shaft 12. When the clutch makes a complete revolution it automatically disengages according to conventional practice. However, after switch 154b closes, it will remain closed as long as the cycle-start switches are closed even after the machine completes its operating cycle and prevents the machine from recycling in the event the operator holds the cycle-start switches closed until after the machine has completed its cycle of operation. In the event the operator properly releases the cycle-start switches after the machine starts in operation, the machine will of course merely complete its cycle and then stop automatically when the clutch 16 disengages, pending initiation of a new cycle of operation by closure of the cycle-start switches. Also, when the valve-operating solenoid 102 is de-energized by cam 164, the valve controlling flow of air to the cylinder 30 reverses, ball 92 engaging its seat to shut off air to the cylinder and valve 94 leaving its seat, permitting air to vent from the cylinder 30. When the valve is positioned in this manner, spring 66 easily retracts or raises the piston to its initial position in the cylinder 30. This completes the cycle of operation and prepares the machine for the next operating cycle.

Having thus described the invention, I claim:

1. A control for punch presses and the like comprising a cylinder, a piston mounted for reciprocation in said cylinder and adapted to be operatively connected to the cycle-start mechanism of a machine tool, means forming an air passage to said cylinder at one side of the piston so that air admitted to the cylinder through said passage acts against the piston to advance the same, said passage having a bifurcated outer portion and said bifurcations forming an air inlet and an air outlet respectively, a spring coactive with the piston to retract the same when air pressure to the cylinder is shut off, a valve at the bifurcated portion of the passage for controlling the flow of air to and from said cylinder and having aligned bearings in respective bifurcations, valve seats at the outer sides of the bearings, valve members mounted to engage and movable relative to respective seats, springs behind and bearing against the valve members operative to engage the latter with said seats, a rod slidable on said bearings interposed between and mutually engaging said valve members, said rod being longer than the distance between said seats so as always to hold one valve member off its seat when the other valve member is in engagement with its seat, a solenoid having an armature for operating said valve, and an element carried by and movable with said armature forming a seat for one of said springs, the valve member associated with said spring being normally open when the solenoid is de-energized; and said solenoid, when energized, acting through the armature and the spring associated therewith to close said valve.

2. A control for punch presses and the like comprising a cylinder, a guide extending axially into the cylinder from one end thereof, a piston mounted for reciprocation in said cylinder and on said guide, a hollow stem on the piston fitting over and loosely receiving said guide adapted to be operatively connected to the cycle start mechanism of a machine tool, means forming an air passage to said cylinder at one side of the piston so that air admitted into the cylinder through said passage acts against the piston to advance the same, said passage having a bifurcated outer portion and the bifurcation forming an air inlet and an air outlet respectively, a spring housed within said hollow stem and disposed around said guide adapted to be compressed when the piston advances in the cylinder and to retract the piston automatically when pressure thereagainst is released, a valve in the bifurcated portion of the passage for controlling the flow of air to and from said cylinder and having aligned bearings in respective bifurcations, valve seats at the outer sides of the bearings, valve members mounted to engage and movable relative to respective seats, springs behind and bearing against the valve members operative to engage the latter with said seats, a rod interposed between and mutually engaging said valve members, said rod being longer than the distance between said seats so as always to hold one valve member off its seat when the other valve member is in engagement with its seat, a solenoid having an armature for operating said valve, and an element carried by and movable with said armature forming a seat for one of said springs, the valve member associated with said spring being normally open when the solenoid is de-energized, and said solenoids, when energized, acting through the armature and the spring associated therewith to close said valve.

3. A control for punch presses and the like comprising a cylinder, a piston mounted for reciprocation in said cylinder and adapted to be operatively connected to the cycle-start mechanism of a machine tool, means forming an air passage to said cylinder at one side of the piston so that air admitted to the cylinder through said passage acts against the piston to advance the same, said passage having a bifurcated outer portion and said bifurcations forming an air inlet and an air outlet respectively, a spring coactive with the piston to retract the same when air pressure to the cylinder is shut off, a valve controlling the bifurcated portion of the passage having aligned bearings in respective bifurcations, valve seats at the outer sides of the bearings, valve members mounted to engage and movable relative to respective seats, a rod interposed between and mutually engaging said valve members, said rod being longer than the distance between said seats so as to hold one valve member off its seat when the other valve member is in engagement with its seat, a solenoid having an armature disposed opposite and spaced from one of said valve members, relatively strong spring means interposed between said one valve and said armature serving a double function of holding said one valve normally closed and of overcoming residual magnetism in the solenoid so that said armature always returns to its initial position when the solenoid is de-energized, and a relatively weak spring behind and acting against the other of said valve members operative to close said other valve member against the action of said relatively strong spring when the solenoid is de-energized.

4. A control for punch presses and the like comprising a cylinder, a piston mounted for reciprocation in said cylinder and adapted to be operatively connected to the cycle start mechanism of a machine tool, means forming an air passage to said cylinder at one side of the piston so that air admitted to the cylinder through said passage acts against the piston to advance the same, said passage having a bifurcated outer portion and said bifurcations forming an air inlet and an air outlet respectively, a spring coactive with the piston to retract the same when air pressure to the cylinder is shut off, a valve controlling the bifurcated portion of the passage having aligned bearings in respective bifurcations, valve seats at the outer sides of the bearings, ball valves mounted to engage and movable relative to respective seats, springs behind the ball valves operative to engage the latter with said seats, a rod interposed between and having cupped ends seating against and conforming to the engaged surfaces of said ball valves, said rod being longer than the distance between said seats so as always to hold one ball valve off its seat when the other ball valve is in engagement with its seat, the cupped ends of the rod holding the latter properly engaged with the valves and accurately centered with respect to said bearings so as to prevent binding of the rod in operation and to prevent wear by rubbing of the rod against the bearings, a solenoid having an armature for operating said valve, and an element carried by and movable with said armature forming a seat for one of said springs, the valve member associated with said spring being normally open when the solenoid is de-energized, and said solenoid, when energized, acting through the armature and the spring associated therewith to close said valve.

5. A control for punch presses and the like comprising a cylinder, a guide extending axially into the cylinder from one end thereof, a piston mounted for reciprocation in said cylinder and on said guide, a hollow stem on the piston fitting over and loosely receiving said guide adapted to be operatively connected to the cycle-start mechanism of a machine tool, means forming an air passage to said cylinder at one side of the piston so that air admitted into the cylinder through said passage acts against the piston to advance the same, said passage having a bifurcated portion and the bifurcations forming an air inlet and an air outlet respectively, a spring housed within said hollow stem and disposed around said guide adapted to be compressed when the piston advances in the cylinder and to retract the piston automatically when pressure thereagainst is released, an inverted, U-shaped, flexible seal fitting relatively snugly around the upper end of said stem, the open underside of said seal communicating with the cylinder so that any air escaping from the cylinder expands the seal against the stem, said seal releasing said stem when there is no air in the cylinder so as to reduce friction tending to retard movement of the piston and to reduce wear on both the seal and the stem during reciprocation of the piston, a valve in the bifurcated portion of the passage for controlling the flow of air to and from said cylinder and having aligned bearings in respective bifurcations, valve seats at the outer sides of the bearings, valve members mounted to engage and movable relative to respective seats, springs behind and bearing against the valve members operative to engage the latter with said seats, a rod interposed between and mutually engaging said valve members, said rod being longer than the distance between said seats so as always to hold one valve member off its seat when the other valve member is in engagement with its seat, a solenoid having an armature for operating said valve, and an element carried by and movable with said armature forming a seat for one of said springs, the valve member associated with said spring being normally open when the solenoid is de-energized, and said solenoid, when energized, acting through the armature and the spring associated therewith to close said valve.

6. A control for punch presses and the like comprising a housing having a cylinder portion and a valve portion interconnected by an integral web, said cylinder portion having a cylinder, and a piston mounted for reciprocation in the cylinder, said housing being provided with an air passage extending from the cylinder at one side of the piston through said web portion and into the valve portion of said housing, and said passage being bifurcated in the valve portion of the housing, valve means in the bifurcated portion of the passage for controlling the flow of air into and from said cylinder and having aligned bearings in respective bifurcations of said passage, valve seats at the outer sides of the bearings, valve members mounted to engage and movable relative to respective seats, spring behind and bearing against the valve members operative to engage the latter with said seats, a rod interposed between and mutually engaging said valve members, said rod being longer than the distance between said seats so as always to hold one valve member off its seat when the other valve member is in engagement with its seat.

7. A control for punch presses and the like comprising a housing having a cylinder portion and a valve portion interconnected by an integral web portion, said cylinder portion having a cylinder, and a piston mounted for reciprocation in the cylinder, said housing being provided with an air passage extending from the cylinder at one side of the piston through said web portion and into the valve portion of said housing, and said passage being bifurcated in the valve portion of the housing, valve means in the bifurcated portion of the passage for controlling the flow of air into and from said cylinder and having aligned bearings in respective bifurcations of said passage, valve seats at the outer sides of the bearings, valve members mounted to engage and movable relative to respective seats, springs behind and bearing against the valve members operative to engage the latter with said seats, a rod interposed between and mutually engaging said valve members, said rod being longer than the distance between said seats so as always to hold one valve member off its seat when the other valve member is in engagement with its seat, a solenoid having an armature forming a seat for one of said springs, the valve member associated with said one spring being normally open when the solenoid is de-energized, and said solenoid, when energized, acting through the armature and spring associated therewith to close said valve.

References Cited in the file of this patent

UNITED STATES PATENTS

| | | |
|---|---|---|
| 1,193,036 | McElroy | Aug. 1, 1916 |
| 1,540,181 | Olson | June 2, 1925 |
| 1,634,382 | Oberschmidt | July 5, 1927 |
| 1,866,347 | Crocker | July 5, 1932 |
| 2,300,263 | McLeod | Oct. 27, 1942 |
| 2,315,816 | Rodgers | Apr. 6, 1943 |
| 2,336,887 | Piron | Dec. 14, 1943 |
| 2,341,689 | Bryson | Feb. 15, 1944 |
| 2,398,452 | Shaw | Apr. 16, 1946 |
| 2,535,785 | Couri | Dec. 26, 1950 |

FOREIGN PATENTS

| | | |
|---|---|---|
| 445,559 | Great Britain | Apr. 14, 1936 |